(12) United States Patent
Movshovish et al.

(10) Patent No.: US 6,956,621 B2
(45) Date of Patent: Oct. 18, 2005

(54) HIGH IMPEDANCE DIGITAL FULL LINE VIDEO CLAMP

(75) Inventors: Aleksandr Movshovish, Santa Clara, CA (US); Meng Li, San Jose, CA (US); Sumant Ranganathan, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 510 days.

(21) Appl. No.: 10/162,083

(22) Filed: Jun. 5, 2002

(65) Prior Publication Data

US 2003/0227571 A1   Dec. 11, 2003

(51) Int. Cl.[7] ............................................... H04N 5/18
(52) U.S. Cl. ........................................................ 348/691
(58) Field of Search ................................ 348/682, 691, 348/697, 694; 341/118, 155

(56) References Cited

U.S. PATENT DOCUMENTS

| | | | |
|---|---|---|---|
| 4,228,463 A * | 10/1980 | Steckler et al. | 348/545 |
| 4,386,370 A * | 5/1983 | Harwood et al. | 348/625 |
| 4,564,863 A | 1/1986 | Chameroy et al. | |
| 5,084,700 A * | 1/1992 | Christopher | 341/118 |
| 5,371,552 A * | 12/1994 | Brummette et al. | 348/697 |
| 5,410,363 A * | 4/1995 | Capen et al. | 348/679 |
| 5,841,488 A * | 11/1998 | Rumreich | 348/694 |
| 5,986,719 A * | 11/1999 | Nakamura | 348/545 |
| 6,492,921 B1 * | 12/2002 | Kunitani et al. | 341/118 |

FOREIGN PATENT DOCUMENTS

| | | |
|---|---|---|
| EP | 0 280 123 A1 | 2/1988 |
| EP | 0 609 759 A2 | 1/1994 |
| EP | 0 926 887 A2 | 12/1998 |
| WO | WO 00/57556 | 9/2000 |
| WO | WO 02/43375 A2 | 11/2001 |

OTHER PUBLICATIONS

European Search Report for Appln. No. EP 03012795.5-1241, issued Sep. 22, 2003, 3 pages.

* cited by examiner

*Primary Examiner*—Paulos M. Natnael
(74) *Attorney, Agent, or Firm*—Sterne, Kessler, Goldstein & Fox PLLC

(57) ABSTRACT

A circuit for clamping a TV signal includes an input capacitor coupled to the TV signal, an analog-to-digital converter that outputs a digital signal corresponding to TV signal, a comparator that compares the digital signal to a black level signal, and a high impedance driver that charges the input capacitor in response to an output of the comparator.

26 Claims, 4 Drawing Sheets

HIGH IMPEDANCE DIGITAL FULL LINE VIDEO CLAMP

BACKGROUND OF THE INVENTION

1. Field of the Invention

The present invention relates to a clamping circuit for our use in a color television circuit, and more particularly, to a high impedance clamping circuit for use in digital television circuit.

2. Related Art

FIG. 1 shows a standard NTSC composite video signal. According to IRE (Institute of Radio Engineers) standard, 1 Volt Peak to Peak Video is divided up into 140 IRE units. This is done to make numbers for luminance levels easier to communicate. The amplitude of the video signal from blanking (zero volts) to peak white is 0.714286 volts or 100 IRE units. Synchronization signals extend from blanking to −1.285714 volts/−40 IRE units.

A horizontal sync is the −40 IRE pulse occurring at the beginning of each line. This pulse signals the electronic beam of the picture monitor to go back to the left side of the screen and trace another horizontal line picture information. The horizontal sync (HSYNC) signals the beginning of each new video line.

Luminance is a signal which represents brightness, or the amount of light in the picture. This is the only signal required for black and white pictures, and for color systems it is obtained as a weighted sum (Y=0.3R+0.59G+0.11B) of the R, G and B signals.

Chroma is the characteristics of color information, independent of luminance intensity. Hue and saturation are qualities of chroma. The chroma signal consists of two quadrature components modulated on to a carrier at the color burst frequency. The phase and amplitude of these components determine the color content at each pixel.

The horizontal sync is followed by a back porch, which is used as a reference level to restore the DC component (i.e., brightness) of an otherwise floating AC-coupled video signal. This process of DC level restoration is named "clamping", and takes place during the back porch. In color systems, a burst (called "color burst") of sub-carrier frequency is located on a back porch of the composite video signal, as shown in FIG. 1. The back porch represents a black level of the video signal, while the color burst serves as a color synchronizing signal to establish a frequency and phase reference for the chrominance signal. Thus, the color burst is a high-frequency region that provides a phase and amplitude reference for the subsequent color information.

A clamp is a circuit that restores the DC component of a signal. A video clamp circuit, usually triggered by the horizontal synchronizing pulses, re-establishes a fixed DC reference level for the video signal. A major benefit of clamping is the removal of low-frequency interference, especially power line hum.

In a digital system, an A/D converter must sample the analog composite signal before the luma and chroma are separated into their respective channels. The clamp, or a DC restore circuit, is needed to keep the analog signal within the dynamic range of the A/D converter. The blank level is measured during the color burst area (after a digital low pass filter), but the clamp pulse cannot be applied to the incoming analog signal during this same time. The analog burst must be maintained because it is used to demodulate the chroma into its baseband signal. Adding a pulse during the back porch is difficult due to tolerance on the 10.8 μs from sync to active video and extra long bursts for copy protection (Macrovision).

SUMMARY OF THE INVENTION

The present invention is directed to a high impedance clamping circuit that substantially obviates one or more of the problems and disadvantages of the related art.

There is provided a circuit for clamping a TV signal including an input capacitor coupled to the TV signal, an analog-to-digital converter that outputs a digital signal corresponding to TV signal, a comparator that compares the digital signal to a black level signal, and a high impedance driver that charges the input capacitor in response to an output of the comparator.

In another aspect of the present invention there is provided a method of clamping a TV signal including the steps of coupling the TV signal to an input capacitor, converting the TV signal from analog to digital form to produce a digital signal corresponding to TV signal, comparing the digital signal to a black level signal, and charging the input capacitor in response to an output of the comparator using a high impedance driver.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

Figure 1:
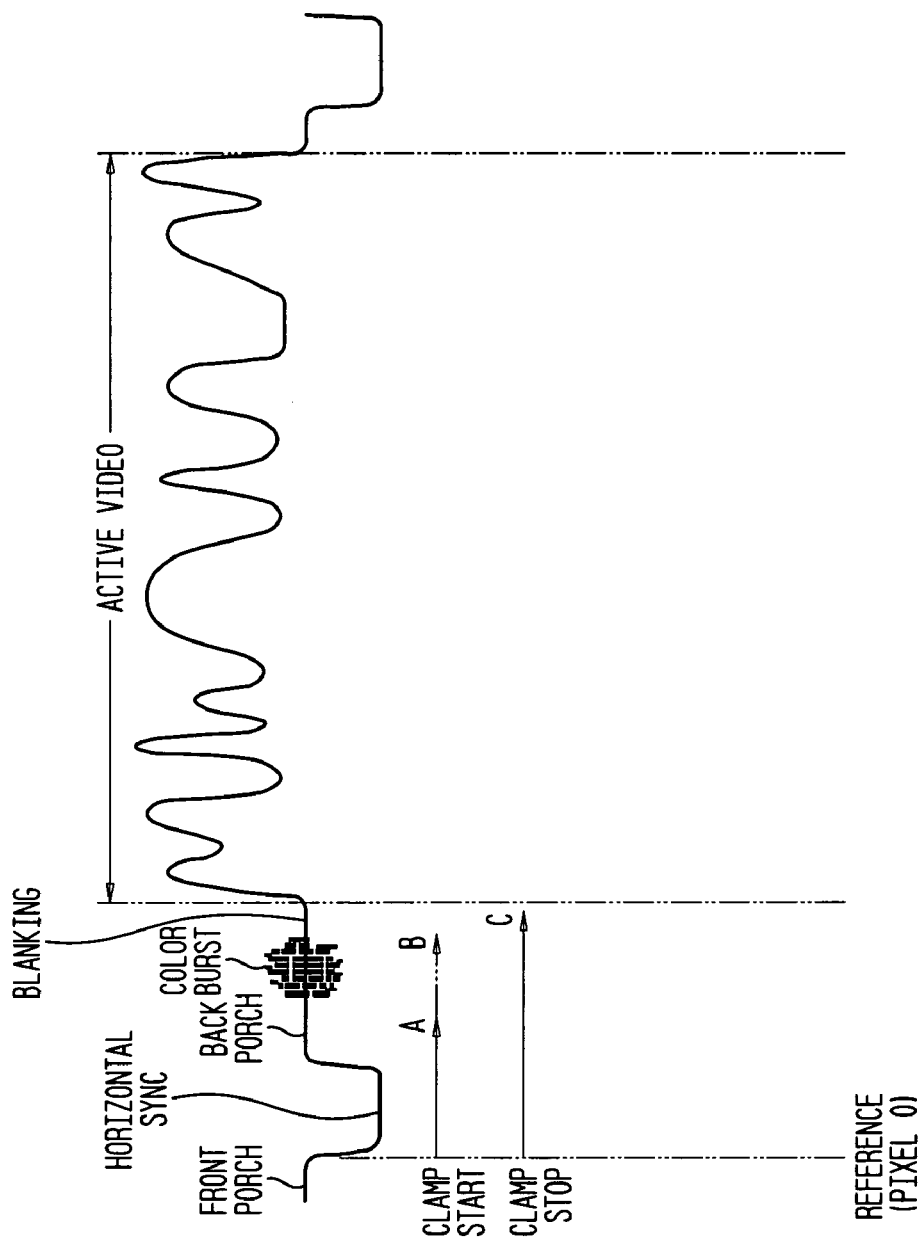
FIG. 1 illustrates a format of a typical NTSC video signal.
Figure 2:
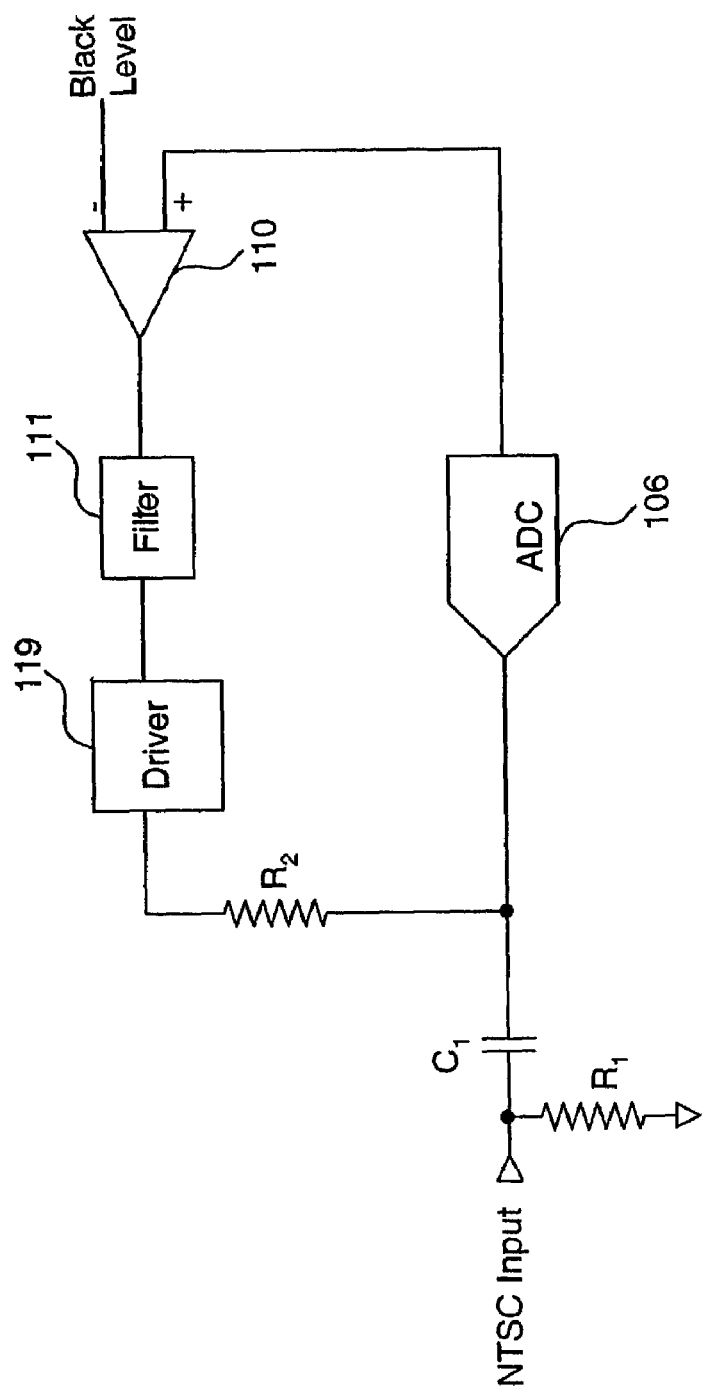
FIG. 2 illustrates a block diagram of an embodiment of the present invention.

FIG. 2 illustrates a block diagram of the high-impedance clamp of the present invention in the form of a feedback control loop. As shown in FIG. 2, an NTSC video signal is terminated with a resistor $R_1$ and inputted to an analog-to-digital converter (ADC) 106 through an AC coupling capacitor (input capacitor) $C_1$. The video signal then goes into the analog-to-digital converter (ADC) 106, which converts it to digital form. The digital signal then is compared using a digital comparator 110 with a reference black level, which is standard-specific (i.e., NTSC vs. PAL standard, etc.)

The output of the digital comparator 110 goes into a filter 111, preferably a low-pass filter, and then into a driver 119. The driver 119 is coupled to the input of the analog-to-digital converter 106 through a resistor $R_2$, whose value is typically at least 100 times larger than the value of the resistance $R_1$, to function as a high-impedance driver. In other words, the driver has a relatively high output impedance.

Figure 3:
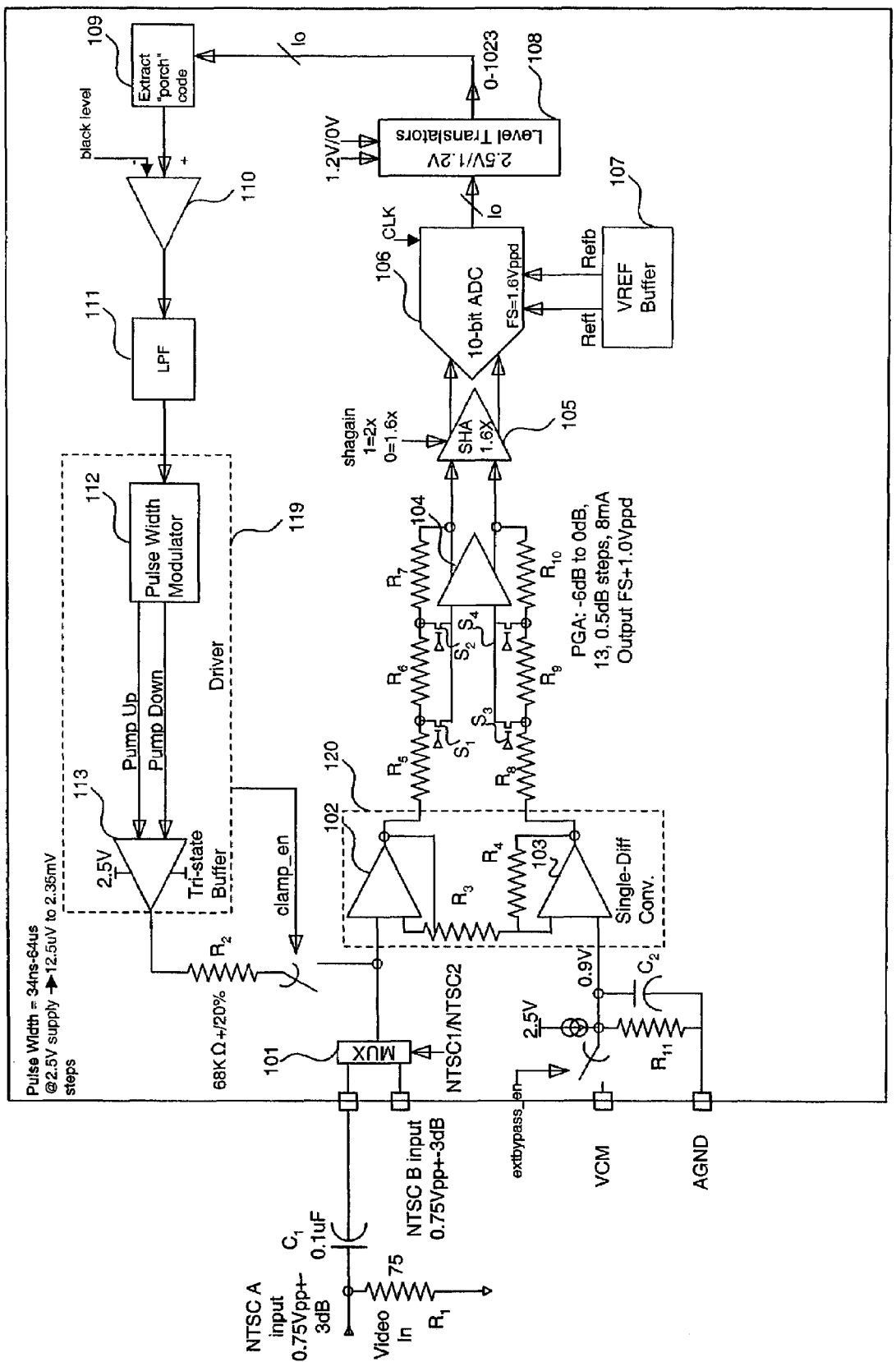
FIG. 3 illustrates a circuit diagram of an embodiment of the present invention.

FIG. 3 illustrates one embodiment of the present invention. As shown in FIG. 3, an NTSC channel A signal, such as a video signal from a cable box or a TV antenna, is coupled to the impedance matching resistor $R_1$ of 75 ohms. The input capacitor $C_1$, e.g., a 0.1 µF capacitor, is used to decouple the DC component of the video signal. An additional input is provided for channel B input. The video signal passes through a multiplexer 101, which is a bidirectional multiplexer (essentially a switch, rather than a one way multiplexer commonly found in digital circuits).

The multiplexed signal then goes into a single-ended-to-differential converter 120, which includes amplifiers 102, 104 and resistors $R_3$, $R_4$. The converter 120 also includes a 2.5 V voltage source, and an RC network formed by $C_2$ and $R_{11}$. It is common practice to convert a signal from a single to a differential type of signal, to improve common mode rejection, and to improve the signals noise characteristics. Thus, the converter 120 converts the input TV signal to a differential signal.

The differential signal is then inputted into a programmable gain amplifier (PGA) 104 (0.5 dB step size, −6 dB to 0 db gain range), which includes a resistor ladder R5, R6, R7, R8, R9 and R10. A plurality of switches $S_1$, $S_2$, $S_3$, $S_4$ allow programming of the gain of the programmable gain amplifier 104. (In the actual implemented embodiment, there are 13 resistors on each side of the programmable gain amplifier 104, rather than the six shown in the circuit diagram of FIG. 3, together with a corresponding number of switches.)

The PGA 104 outputs an amplified signal into a sample and hold amplifier (SHA) 105, which provides a gain of either 1.6× or 2×. The signal then is inputted into the 10 bit analog-to-digital converter (ADC) 106. The ADC 106 also uses a reference voltage source 107, and has a clock input CLK.

The ADC 106 outputs a converted value of the signal in digital form on 10 digital signal lines to a level translator 108. The level translator 108 converts the level of the signal from 2.5 volts to 1.2 volts. Note that the level translator 108 is needed primarily due to processing requirements of the ADC 106, and a different process of manufacturing the ADC 106 can eliminate the need for the level translator 108.

The level translator 108 outputs the digital signal, which is now 0 volts/1.2 volts, to an "extract porch code" block 109. The "extract porch code" block 109 takes the digital signal and suppresses the digital signal everywhere except during a time window corresponding to the back porch portion of the video signal. It also filters the digital signal to reduce to noise component of the digital signal.

The digital signal is then outputted to a digital comparator 110, which compares it with a preset black level voltage reference. The digital signal is then outputted to a low pass filter 111, and then to the driver 119, which includes a pulse width modulator (PWM) 112 and a tri-state buffer 113 based on the output of the digital comparator 110.

The PWM 112 outputs control signals to the tri-state buffer 113. The PWM 112 output includes three signals, Pump_up, Pump_down (both of which control the tri-state buffer 113), and a Clamp_en signal. If the Clamp_en is high and the Pump_up signal is high, the tri-state buffer 113 output is set to 2.5V, and the input level to the converter 120 is charged up through the 68 KΩ resistor $R_2$. If the Clamp_en is high and the Pump_down signal is high, the tri-state buffer 113 output is set to 0V and the input level to the converter 120 is charged down through the 68 KΩ resistor $R_2$. If the Clamp_en is high and neither Pump_up nor Pump_down are asserted, then the tri-state buffer 113 output becomes high impedance, and the converter 120 input remains at its existing level. When the Clamp_en signal is low, the internal clamp is disabled. The DC input level to the converter 120 can be set to any value between 0V and 2.5V by modulating the duty cycle of Pump_up and Pump_down.

As noted above, the "extract porch code" block 109, which extracts the back porch level, and, more specifically, sets the duty cycle of the pulse width modulated (PWM) clamp signals to set the porch to a specific DC level at the input to the converter 120. The DC level is chosen to center the entire video signal within the ideal dynamic range of the converter 120, the PGA 103 and the SHA 105. The pulse width of Pump_up and Pump_down can be controlled in steps of 34 ns from 34 ns to 64 µs, depending on the output of the comparator 110. For example if Pump_up was turned on for a period of 34 ns then the converter 120 input would move up by (2.5*34 nsec/6.8 msec)=12.5 µV. A time constant that determines the rate of change of the converter 120 input is determined by the 68 KΩ clamp resistor $R_2$ and the 0.1 µF input capacitor $C_1$ (in this case, 6.8 msec).

Figure 4:
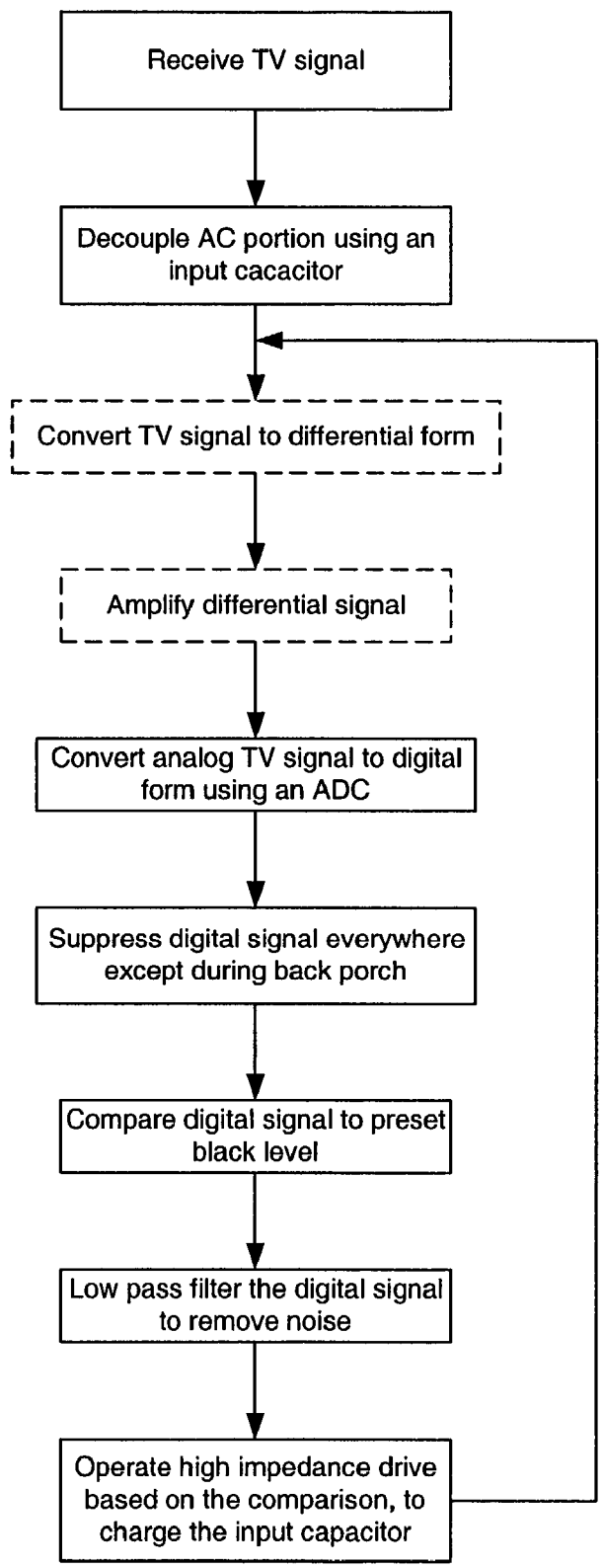
FIG. 4 is a flow chart illustrating operation of one embodiment of the present invention.

The preset black level voltage level is usually determined by external software. For example, if it is set to 100, and the digital signal is 120, the difference is 20, and the PWM 111 is on for (120−100)×34 ns, or 20 34-nsec periods. The next time the comparison is done, the digital signal is, for example, 108, so the PWM 111 will be on for (108−100)×34 nsec, or for 8 34-nsec periods. This process is also illustrated in FIG. 4.

The resistor $R_2$ should be high enough to ensure that the impedance of the circuit is high compared to $R_1$, which is 75 Ω. The NTSC standard requires that the maximum distortion of the video signal be limited to 1%. Thus, the lower limit on the resistor $R_2$ is about 100 times the 75 Ω impedance seen by the NTSC signal, or 7.5 KΩ. It will be appreciated by one of ordinary skill in the art that other sources of distortion are typically present in the system, and the value of the resistor $R_2$ in a typical application needs to be higher than 7.5 KΩ.

The high-impedance clamp of the present invention allows for the capacitor $C_1$ to keep its charge during the entire 63.5 µsec line, rather than clamping $C_1$ only during a portion of the back porch when the color burst is not present. Instead of trying to position a small pulse in a very narrow region of the back porch and adjusting the DC level instantaneously for the entire line, the present invention allows to slowly adjust the DC level during a period of an entire line due to the high impedance of the driver 119.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A circuit for clamping a TV signal comprising:
   an input capacitor coupled to the TV signal;
   an analog-to-digital converter that outputs a digital signal corresponding to the TV signal;
   a comparator that compares the digital signal to a black level signal; and
   a high impedance driver that charges the input capacitor in response to an output of the comparator,
   wherein the high impedance driver includes a pulse width modulator coupled to the output of the comparator.

2. The circuit of claim 1, further including a low pass filter between the comparator and the high impedance driver.

3. The circuit of claim 1, further including a single to differential voltage converter that converts the TV signal to differential form prior to inputting the TV signal into the analog to digital converter.

4. A circuit for clamping a TV signal comprising:
   an input capacitor coupled to the TV signal;
   a single to differential voltage converter that converts the TV signal to differential form prior to inputting the TV signal into the analog to digital converter;
   an analog-to-digital converter that outputs a digital signal corresponding to the TV signal;
   a comparator that compares the digital signal to a black level signal; and
   a high impedance driver that charges the input capacitor in response to an output of the comparator; and
   a programmable gain amplifier that amplifies the TV signal after it is converted to differential form by the single to differential voltage converter.

5. The circuit of claim 1, wherein the high impedance driver includes a clamp resistor coupled to the input capacitor, the clamp resistor being at least 1 times higher than an impedance seen by the TV signal.

6. The circuit of claim 1, wherein the high impedance driver includes a tri-state buffer enabled by an output of the pulse width modulator.

7. The circuit of claim 6, wherein the pulse width modulator outputs a clamp enable signal to connect the output of the tri-state buffer to the input capacitor.

8. The circuit of claim 1, wherein the high impedance driver includes a current source.

9. The circuit of claim 1, wherein the high impedance driver includes a voltage source.

10. A circuit for clamping a TV signal comprising;
    an input capacitor coupled to the TV signal;
    an analog-to-digital converter that outputs a digital signal corresponding to the TV signal;
    a comparator that compares the digital signal to a black level signal; and
    a high impedance driver that charges the input capacitor in response to an output of the comparator; and
    a circuit that enables the digital signal only during a back porch period of the TV signal for inputting the digital signal into the comparator.

11. A method of clamping a TV signal comprising the steps of:
    coupling the TV signal to an input capacitor;
    converting the TV signal to differential form;
    amplifying the differential TV signal;
    converting the amplified differential TV signal from analog to digital form to produce a digital signal corresponding to the TV signal;
    comparing the digital signal to a black level signal; and
    charging the input capacitor in response to an output of the comparator using a high impedance driver.

12. The method of claim 11, further including the step of low pass filtering the digital signal after said comparing step.

13. The method of claim 11, wherein said step of charging the input capacitor uses a resistor coupled to the input capacitor, the resistor being at least 1 times higher than an impedance seen by the TV signal.

14. A method of clamping a TV signal comprising the steps of:
    coupling the TV signal to an input capacitor;
    converting the TV signal from analog to digital form to produce a digital signal corresponding to the TV signal;
    comparing the digital signal to a black level signal;
    charging the input capacitor in response to an output of the comparator using a high impedance driver; and
    driving a pulse width modulator using the output of the comparator, the pulse width modulator charging the input capacitor.

15. The method of claim 14, wherein the pulse width modulator outputs a clamp enable signal to connect the output of the driver to the input capacitor.

16. The method of claim 11, wherein the driver includes a voltage source.

17. The circuit of claim 11, wherein the high impedance driver includes a current source.

18. A method of clamping a TV signal comprising the steps of:
    coupling the TV signal to an input capacitor;
    converting the TV signal from analog to digital form to produce a digital signal corresponding to the TV signal;
    comparing the digital signal to a black level signal;
    charging the input capacitor in response to an output of the comparator using a high impedance driver; and
    enabling the digital signal only during a back porch period of the TV signal prior to said comparing step.

19. A circuit for clamping a TV signal comprising:
    capacitor means for coupling an analog TV signal;
    means for converting the analog TV signal to a digital TV signal;
    means for comparing the digital TV signal to a black level signal;
    means for enabling the digital TV signal only during a back porch period of the analog TV signal before inputting the digital signal into the means for comparing; and
    driver means having high output impedance for charging the capacitor means in response to an output of the means for comparing.

20. The circuit of claim 19, further including means for low pass filtering the digital TV signal between the means for comparing and the high impedance driver means.

21. A circuit for clamping a TV signal comprising:
    capacitor means for coupling an analog TV signal;
    single to differential voltage converter means for converting the analog TV signal to a differential analog TV signal;
    means for converting the differential analog TV signal to a digital TV signal;
    means for comparing the digital TV signal to a black level signal;
    driver means having high output impedance for charging the capacitor means in response to an output of the means for comparing; and
    programmable gain amplifying means for amplifying the TV signal after it is converted to differential form by the differential voltage converter means.

22. The circuit of claim 19, wherein the driver means includes a resistor coupled to the capacitor means, the resistor being at least 1 times higher than an impedance seen by the analog TV signal.

23. A circuit for clamping a TV signal comprising:
capacitor means for coupling an analog TV signal;
means for converting the analog TV signal to a digital TV signal;
means for comparing the digital TV signal to a black level signal; and
driver means having high output impedance for charging the capacitor means in response to an output of the means for comparing,
wherein the driver means includes a pulse width modulator coupled to the output of the means for comparing, and a tri-state buffer controlled by the pulse width modulator.

24. The circuit of claim 23, wherein the pulse width modulator outputs a clamp enable signal to connect a tri-state buffer to the capacitor means.

25. The circuit of claim 19, wherein the driver means includes a voltage source.

26. The circuit of claim 19, wherein the driver means includes a current source.

* * * * *

UNITED STATES PATENT AND TRADEMARK OFFICE
CERTIFICATE OF CORRECTION

PATENT NO. : 6,956,621 B2
APPLICATION NO. : 10/162083
DATED : October 18, 2005
INVENTOR(S) : Movshovich et al.

It is certified that error appears in the above-identified patent and that said Letters Patent is hereby corrected as shown below:

Title Page, Item [75] please replace "Movshovish" with --Movshovich--.

Signed and Sealed this

Third Day of April, 2007

JON W. DUDAS
*Director of the United States Patent and Trademark Office*